United States Patent [19]

Garzia et al.

[11] 4,086,345

[45] Apr. 25, 1978

[54] PRODUCT AND METHOD FOR COMBATTING SWINE DYSENTERY

[75] Inventors: Aldo Garzia, Lodi (Milan), Italy; Robert D. Williams, Terre Haute, Ind.

[73] Assignee: Istituto Chemioterapico Italiano, Italy

[21] Appl. No.: 772,863

[22] Filed: Feb. 28, 1977

Related U.S. Application Data

[63] Continuation-in-part of Ser. No. 672,089, Mar. 31, 1976, abandoned.

[51] Int. Cl.² ............................................ A61K 31/505
[52] U.S. Cl. ....................................................... 424/251
[58] Field of Search ........................................ 424/251

[56] References Cited

PUBLICATIONS

Anon–Chem. Abst. vol. 80, (1974) p. 63778G.

*Primary Examiner*—Sam Rosen
*Attorney, Agent, or Firm*—Bernard & Brown

[57] ABSTRACT

Compositions and method for combatting swine dysentery using substituted quinoxalines represented by the formula:

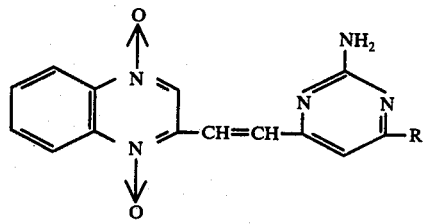

where R is hydrogen or lower alkyl of 1 to 5 carbon atoms, e.g., methyl and pentyl, are provided.

23 Claims, No Drawings

PRODUCT AND METHOD FOR COMBATTING SWINE DYSENTERY

This application is a continuation-in-part of application Ser. No. 672,089, filed Mar. 31, 1976, abandoned.

This invention relates to compositions useful for, and a method of, combatting swine dysentery. In a particular aspect, this invention relates to a method of combatting swine dysentery by administration to swine, exposed or likely to be exposed to dysentery-producing organisms, a member of a class of certain substituted quinoxalines.

BACKGROUND OF THE INVENTION

Swine dysentery (also known as vibrionic dysentery, bloody scours, or hemorrhagic dysentery) is an enteric disease primarily characterized by muco-hemorrhagic diarrhea with lesions usually restricted to the large intestine. The disease is worldwide and rapidly becoming the prime disease problem among swine producers in this country.

The earlier consensus was that *Vibrio coli* was the primary causative agent. Recent evidence suggests, however, that a spirochete, *Treponema hyodysenteriae* is involved with the disease and may in fact be the primary etiologic agent.

Currently, control measures are based on constant feeding of antibacterial agents with therapy based on use of higher levels of these drugs. Such drugs include furozolidone, neomycin, oxytetracycline, tylosin, carbadox, virginiamycin and arsanilic acid. Unfortunately these drugs give erratic results, even when used at abnormally high levels.

Accordingly there is a continuing need for new drugs of low toxicity and high potency to combat swine dysentery.

SUMMARY OF THE INVENTION

It is an object of this invention to provide a composition for, and method of, combatting swine dysentery.

It is another object of this invention to provide a method of combatting swine dysentery by prophylatic or therapeutic administration of a substituted quinoxaline.

It is a further object of this invention to provide a composition for, and method of, combatting swine dysentery by the prophylatic or therapeutic administration of a substituted quinoxaline which selectively combats the swine dysentery-causing organisms without deleterously affecting the balance of other organisms desired in an environment, e.g., in the internal biological system of swine, e.g., the intestinal flora.

Other objects will be apparent to those skilled in the art from the disclosure herein.

It is the discovery of this invention to provide a composition for and method of combatting swine dysentery by administering to animals likely to be exposed to dysentery-producing organisms, or to animals suffering from the disease, a substituted quinoxaline (hereafter the "C-Compounds") dioxide represented by the formula:

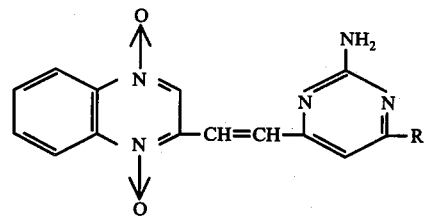

wherein R is hydrogen or lower alkyl of 1 to 5 carbon atoms, e.g., methyl, ethyl, propyl, butyl, pentyl, and the like. The compounds are especially useful for prophylactic administration prior to development of symptoms of dysentery.

DETAILED DISCLOSURE

According to the method of the present invention, a C-Compound(s) is administered to swine in amounts effective to combat dysentery. It can be advantageously incorporated in a swine ration to provide a swine feed composition for combating dysentery; in this aspect, it can be incorporated in the swine rations generally at a level of from about 25 g/ton to about 500 g/ton. The preferred level, however, particularly in the absence of the disease, is about 100 to 200 g/ton for prophylaxis, advantageously for a period of 3 to 21 days. However if there has been an outbreak of the disease, or if new animals whose history is not known have been introduced into a herd, the higher level of 200 to 500 g/ton is preferred until the health of the herd is assured. Generally, however, the prophylatic treatment is continued until the animals are ready for market. The C-Compounds can also be administered by incorporation into drinking water provided for swine.

The compounds useful in the practice of the present invention include but are not limited to CO-1 2-[2-(2-amino-4-pyrimidinyl)ethenyl]-quinoxaline 1,4-dioxide (this same compound had been designated in the parent application as 2-[2-amino-3-pyrimidinyl)ethenyl]-quinoxaline 1,4-dioxide) and CO-2 2-[2-(2-amino-6-methyl-4-pyrimidinyl)ethenyl]-quinoxaline 1,4-dioxide (this same compound had been designated in the parent application as 2-[2-(2-amino-3-methyl-5-pyrimidinyl)ethenyl]-quinoxaline 1,4-dioxide).

These compounds are prepared by reacting, advantageously in an approximately 1:1 mole ratio, quinoxaline-di-N-oxide-2-carboxyaldehyde dimethylacetal and a compound represented by the formula

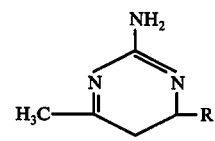

wherein R has the same meaning as defined above.

The reaction is advantageously conducted in the presence of a strong acid catalyst and a suitable solvent, e.g., a lower alkanoic acid such as formic acid or acetic acid. The reaction takes place at reaction temperatures sufficient to effect the reaction and these temperatures can range from ambient, e.g., 0° C. to elevated temperatures, e.g., 80° C. or more and preferably, e.g., at from about 25° to 50° C. or more. When the reaction is complete, e.g., after about 10 to 24 hours, the product is advantageously recovered by crystallizing it from water.

Catalysts suitable for the practice of this invention are generally known as strong acids and any strong acid known in the art can be used. Suitable strong acids include but are not limited to hydrochloric, hydrobromic, sulfuric, nitric, aryl sulfonic acids, e.g., toluene sulfonic acid, trichloroacetic acid, etc. The acids are generally used in a ratio of about 0.5–2 moles of acid per mole of quinoxaline starting compound.

The quinoxaline di-N-oxide-2-carboxyaldehyde dimethylacetal used as a starting material for preparing the compounds of the present invention is known in the art. It can be prepared according to the procedure of Haddadin et al., British Patent 1,305,138, Example XIII, which is incorporated herein by reference thereto.

The pyrimidine compounds used as starting materials are similarly known in the art. They are commercially available and the usual commercial grade is suitable. Preferably they should be of good quality, free from deleterious material.

The C-Compounds are useful for combatting swine dysentery-causing organisms, e.g., dysentery caused by Vibrio or Treponema organisms, or both. The C-Compounds are of a low order of toxicity and are suitable for use by oral administration for prophylactic or therapeutic treatement of dysentery.

A swine feed ration for oral administration of C-Compounds according to this invention can be readily prepared by intimately admixing a C-Compound alone or as a premix with a conventional swine feed composition to provide a homogeneous feed product.

The term feed rations is intended to mean the food provided for the swine, and it is not intended that the invention be limited thereby. Preferably a C-Compound is thoroughly mixed with the feed ration so that it is uniformly dispersed throughout. However it is also contemplated that it could be sprinkled on the daily food supplies in the form of a powder or as pellets. Thus it is not intended that the invention be limited to any particular mode of administration.

The invention will be better understood with reference to the following examples. It is understood however that the examples are intended for illustration only and it is not intended that the invention be limited thereby.

EXAMPLE 1

To a reaction vessel there was added 15 ml of 99% formic acid, 1.15 g of 96% sulfuric acid, 1.09 g (0.01 mole) of 2-amino-4-methyl pyrimidine, and 2.36 g (0.01 mole) of quinoxaline -di-N-oxide-2-carboxyaldehyde dimethylacetal. The mixture was heated to 45°–50° C. and maintained at that temperature for 10 hours. It was then cooled, diluted with 35 ml of cold water and the pH was adjusted to about 5 with sodium bicarbonate. A yellow, crystalline precipitate was formed. It was filtered and washed with water. There was obtained in 64% yield 1.8 g of 2-[2-(2-amino-4-pyrimidinyl)-ethenyl] quinoxaline 1,4-dioxide, m.p. 237°–239° C. with decomposition (this same compound had been designated in the parent application as 2-[2-(2-amino-3-pyrimidinyl)-ethenyl] quinoxaline 1,4-dioxide).

The product, designated CO-1 for convenience, was tested against five strains of Vibrio cholerae at concentrations of 10, 30 and 100 micrograms per milliliter. The results are given in table 1.

Tests were also run to see if the compound was effective against Vibrio cholerae El Tor Ogawa 6 in the presence of sewage. Sewage samples were obtained from the sewer system of the city of Modena, Italy. They were centrifuged to separate solids and the supernatant liquid was used in the tests. The results are given in table 2.

Table 1

| | | Effect on Various Strains of Vibrio Cholerae | | | | |
|---|---|---|---|---|---|---|
| Compound | Concentration μg/ml | Classical Inaba 35 | Classical Ogawa 41 | El Tor Ogawa 6 | El Tor Ogawa 8 | El Tor Inaba 4 |
| CO-1 | 100 | − | − | ± | − | ± |
| | 30 | − | − | − | − | ++ |
| | 10 | − | − | ++ | − | ++ |
| CO-2 | 100 | − | − | ± | − | ± |
| | 30 | − | − | − | − | ++ |
| | 10 | − | − | ++ | − | ++ |

− : No growth after 48 hrs. at 37° C.
± : Just noticeable growth
+ : Evident growth but to a smaller extent than in untreated control experiments
++ : Same degree of growth as in untreated control experiments.

Table 2

| Sample | Concentration of CO-1 | Effect After | | |
|---|---|---|---|---|
| | | 24 hrs. | 48 hrs. | 5 days |
| Control + Vibrion | − | +++ | +++ | +++ |
| Sewage | − | −−− | −−− | −−− |
| Sewage + Vibrion | − | +++ | +++ | +++ |
| Sewage + Vibrion | 5γ/ml | −−− | −−− | −−− |
| Sewage + Vibrion | 10γ/ml | −−− | −−− | −−− |
| Sewage + Vibrion | 20γ/ml | −−− | −−− | −−− |
| Sewage + Vibrion | 30γ/ml | −−− | −−− | −−− |

At 10 μg/ml of CO-1 there was no growth of 3 of the organisms after 48 hours, and only marginal growth of the remaining two at 100 μg/ml.

CO-1 was tested in vitro against Treponema hyodysenteriae by a known method. The minimum inhibitory concentration (the lowest concentration of compound in a dilution series where growth is inhibited) was 0.1 μg/ml. The minimum bacteriocidal concentration (the lowest concentration of compound in which no viable treponemes are observed upon dilution and subculture from the broth onto blood agar plates) was greater than 0.1 μg/ml but less than 1 μg/ml.

The compound was tested for acute toxicity by several modes of administration in four species, namely mice, rat, guinea pig and rabbit. The compound was found to be of a low order of toxicity. The test results are given below in tables 3, 4, 5 and 6.

Table 3
Acute Toxicity of CO-1 in Female Mice

| Dosage, mg/kg | Dead/Treated Animals after | | | |
|---|---|---|---|---|
| | 1 day | 2 days | 4 days | 7 days |
| *Endoperitoneal Administration* | | | | |
| 2000 | 6/6 | | | 6/6 |
| 1000 | | 6/6 | | 6/6 |
| 500 | | | | 6/12 |
| 250 | | | | 0/18 |
| 0 (x) | | | | 0/6 |
| *Esophageal Administration* | | | | |
| 4000 | | | 1/12 | 1/12 |
| 2000 | | | | 0/12 |
| 1000 | | | | 0/12 |

(x) By gastric gavage and receiving only the vehicle.

Table 4
Acute Toxicity of CO-1 in the Rat a. First Experiment

| Sex | Route of Administration | mg/kg | Dead/Treated within 21 days | Body Weight in g. Start | (m±SEM) Termination | Statistical Significance(°) |
|---|---|---|---|---|---|---|
| M | Esophageal | 4000 | 0/4 | 234.5±13.8 | 288.7±13.8 | t 0.05 |
| M | Esophageal | 0 (x) | 1/4 | 233.7±3.7 | 331.0±0.5 | |
| F | Esophageal | 4000 | 0/4 | 201.2±4.2 | 238.2±12.1 | t 0.05 |
| F | Esophageal | 0 (x) | 1/4 | 189.2±3.9 | 230.0±10.5 | |
| M | Endoperitoneal | 500 | 1/4 | 234.0±6.2 | 314.3±10.3 | t 0.05 |
| M | Endoperitoneal | 0 (x) | 0/4 | 230.0±5.7 | 324.0±8.7 | |
| F | Endoperitoneal | 500 | 2/4 | 206.2±8.7 | 286.0–272.0 | t 0.05 |
| F | Endoperitoneal | 0 (x) | 0/4 | 207.5±4.3 | 253.5±7.7 | |

(x) Only the vehicle was administered by the same route.
(°) Student's t test b. Second Experiment

| Sex | Route of Administration | mg/kg | Dead/Treated within 7 days | Body Weight in g. Start | (± SE) Termination |
|---|---|---|---|---|---|
| M | Esophageal | 4000 | 0/4 | 222.5±6.2 | 231.7±15.7 |
| F | Esophageal | 4000 | 0/4 | 252.0±16.6 | 253.5±12.1 |
| M | Intraperitoneal | 500 | 2/4 | 226.2±6.8 | 225.0–212 |
| F | Intraperitoneal | 500 | 0/4 | 232.5±5.9 | 218.2±7.0 | c. Cumulative Data Regardless of Animal Sex

| Route of Administration | mg/kg | Dead/Treated within 7 days |
|---|---|---|
| Esophageal | 0 (x) | 0/8 |
| Esophageal | 4000 | 0/16 |
| Intraperitoneal | 0 (x) | 0/8 |
| Intraperitoneal | 500 | 4/16 |

(x) Only the vehicle was administered.

Table 5
Acute Toxicity of CO-1 in the Guinea Pig By Esophageal Administration

| Dosage mg/kg | Dead/Treated within 21 days |
|---|---|
| 500 | 0/4 |
| 1000 | 1/4 |
| 2000 | 5/6 |
| 4000 | 6/6 |
| 0 (x) | 0/13 |

(x) Only the vehicle was administered.

Table 6
Acute Toxicity of CO-1 in the Rabbit By Esophageal Administration

| Dosage mg/kg | Dead/Treated within 7 days | Body Weight in g. Start | (m±SE) Termination |
|---|---|---|---|
| 2000 | 0/2* | 2250–2150 | 2180–2140 |
| 1000 | 0/4 | 2037±104.3 | 1922.5±71.5 |
| 0 (x) | 0/4 | 2135±75 | 2262±215 |
| 500 | 0/2 | 2000–2100 | 1650–1550 |

(x) Only the vehicle was administered.
*There were two dead out of seven treated animals, within 4 days.

In view of the favorable acute toxicity data, the compound was administered orally in sub-acute, but relatively large doses, to mice and rats for 15 days. Data were collected on the effects on death rate, weight, liver and kidneys. The data are given in Tables 7 and 8.

Table 7
Subacute Toxicity of CO-1 in the Mouse

Daily Dose: 500 mg. CO-1 by gastric gavage for 15 days.

| Oral Treatment | Dead/Treated | % Body Weight Change (m+SE) | Fresh Organ-to-Body Weight Ratio | |
|---|---|---|---|---|
| | | | Liver | Kidneys |
| Vehicle | 0/10 | 20.4±4.2 | 5.2±0.2 | 1.4±0.1 |
| CO-1, 500 mg/kg/day | 0/10 | −8.1±3.9 | 5.9±0.3 | 1.5±0.1 | a. Mortality and Body Weight
Daily Dose: 1 g/kg/day for 15 days.

| Oral Treatment | Dead/Treated | % Body Weight Change |
|---|---|---|
| Vehicle (H₂O) | 0/12 | 24.54±0.64 |
| CO-1 in H₂O, 1 g/kg/day | 2/12 | 18.5±0.75 |
| Vehicle (adraganth gum) (x) | 0/12 | 25.04±1.18 |
| CO-1 in adraganth gum | 3/12 | 16.27±1.31 | b. SGOT and SGPT (24 hrs. after last dose.)

Units/ml

Table 7-continued

| Subacute Toxicity of CO-1 in the Mouse | | |
|---|---|---|
| Oral Treatment | SGOT | SGPT |
| Vehicle: | | |
| Water | 116 | 4 |
| Adraganth gum | 119 | 6 |
| CO-1 in water | 124 | 9 |
| CO-1 in adraganth gum | 132 | 10 |

Table 8

| Subacute Toxicity of CO-1 in Female Rats | | | |
|---|---|---|---|
| Daily Dose: 22 g/kg/day of CO-1 by gastric gavage for 21 days. | | | |
| | Dead/ | Body Weight in g (m±SE) | |
| Oral Treatment | Treated | Start | Termination |
| Vehicle | 2/6(x) | 200.0±4.1 | 233.2±5.1 |
| CO-1, 2 g/kg/day | 1/6(x) | 204.1±2.0 | 210.6±9.6 |

(x) Death caused by a mistake in esophagus incannalutation. This diagnosis was confirmed at the post-mortem examination.
Daily Dose: 2 g/kg/day of CO-1 by gastric gavage for 21 days.

| Oral | Average Percent Weight of Fresh Organs (m±SE) | | |
|---|---|---|---|
| Treatment | Lung | Liver | Kidneys |
| Vehicle (3 animals) | 0.85±0.06 | 3.45±0.07 | 0.95±0.04 |
| CO-1 (5 animals) | 1.07±0.09 NS | 4.54+0.10 NS(x) | 1.04±03 NS |

(x) Death caused by a mistake in esophagus incannalutation. This diagnosis was confirmed at the post-mortem examination.

In view of the favorable sub-acute toxicity, the chronic toxicity in female mice was studied. The results are given in Table 9.

Table 9

| Chronic Toxicity in the Female Mouse | | | |
|---|---|---|---|
| Daily treatment by gastric gavage for 18 weeks (4.5 months) | | | |
| a. Mortality and Body Weight | | | |
| | Dead/ | Body Weight in g (m±SE) | |
| Oral Treatment | Treated | Start | Termination |
| Vehicle | 3/10 | 28.2±1 | 33.0±1.1 |
| CO-1, 500 mg/kg/day | 2/10 | 30.4±0.9 | 30.0±0.7 |
| CO-1, 250 mg/kg/day | 0/10 | 27.3+0.5 | 26.7+0.7 | b. Urine excretion.

| Urine amount excreted by 6 animals in 6 hours | |
|---|---|
| Oral Treatment | Urine Amount (ml) |
| Controls | 6 |
| CO-1, 500 mg/kg/day | 7 |
| CO-1, 250 mg/kg/day | 6.5 | c. Blood glucose. Mean values for 6 animals. Blood samples were taken 24 hours after the last dose

| Oral Treatment | Blood Glucose |
|---|---|
| Controls | 1.14 |
| CO-1, 500 mg/kg/day | 1.06 |
| CO-1, 250 mg/kg/day | 1.10 |

Table 9-continued d. SGPT and SGOT. Mean values for 6 animals. Blood samples were taken 24 hours after the last dose

| | Units/ml | |
|---|---|---|
| Oral Treatment | SGOT | SGPT |
| Controls | 125 | 5 |
| CO-1, 500 mg/kg/day | 159 | 6 |
| CO-1, 250 mg/kg/day | 118 | 5 |

| Chronic Toxicity of CO-1 in the Female Mouse | | | | |
|---|---|---|---|---|
| e. Fresh Weights of Organs | | | | |
| Oral Treatment | Fresh Organ-to-Body-Weight Ratio (m±SE, 4 animals) | | | |
| | Kidneys | Heart | Liver | Lungs |
| Controls | 0.938±0.044 | 0.481±0.055 | 4.57±0.15 | 0.674±0.044 |
| CO-1, 500 mg/kg/day | 1.07±0.04 | 0.47±0.02 | 4.66±0.91 | 1.011±0.110 |
| CO-1, 250 mg/kg/day | 0.87±0.08 | 0.60±0.08 | 4.57±0.25 | 0.731±0.035 |

In view of the favorable results on chronic toxicity, a teratogenetic study was conducted with male and female mice and rats. The number of young delivered live at birth was comparable with controls. No malformations in either group were observed. The data are given in Table 10.

Table 10

| Teratogenetic Study | | | | |
|---|---|---|---|---|
| a. Animal Species: Mouse. Male and female mice housed together for 10 days. Oral treatment from 3rd day to 13th days. | | | | |
| Oral Treatment | Pregnant/ Treated Animals | No. of Living Fetuses per Delivery (m±SE) | Body Weight of Fetuses in g (m±SE) | No. of Fetuses with Malformations |
| CO-1, 250 mg/kg/day | 3/10(x) | 10.3±0.6 | 1.42±0.05 | 0 |
| Controls | 9/10 | 9.0±0.9 | 1.46±0.07 | 0 |

(x) On the basis of our wide experience, the above result might be casual. The study should be repeated to determine whether CO-1 actually prevents pregnancy.

b. Animal Species: Rat. Same experimental conditions as with the mouse.

| Oral Treatment | Pregnant/ Treated Animals | No. of Living Fetuses per Delivery (m±SE) | Body Weight of Fetuses in g (m±SE) | No. of Fetuses with Malformations |
|---|---|---|---|---|
| CO-1, 250 mg/kg/day | 7/10 | 10.8±0.86 | 7.08±0.19 | 0 |
| Controls | 6/10 | 11.3±1.12 | 6.82±0.40 | 0 |

EXAMPLE 2

Compound CO-1 is mixed with swine rations at a level of 200 g/ton and is fed to swine housed in an area where there has been a previous outbreak of swine dysentery. The members of the herd remain free from symptoms during the duration of their stay. Another herd is housed in a similar area where there has been a previous outbreak of dysentery. They are fed the same rations as the first herd but with no CO-1 or other drug. Many members of the herd develop symptoms of dysentery. CO-1 is then mixed with the rations at a level of 400 g/ton. The spread of the disease is halted and the diseased members become free from symptoms.

EXAMPLE 3

To a reaction vessel there was delivered a solution of 1.15 g of 96% sulfuric acid dissolved in 25 ml acetic acid, 1.23 g (0.01 mole) of 2-amino-4, 6-dimethyl pyrimidine and 1.9 g (0.01 mole) of 2-formyl-quinoxaline-di-N-oxide. The mixture was heated at 40° C. for 16 hours, then cooled, diluted with water and adjusted to pH 5 with sodium bicarbonate solution. The resulting yellow, crystalline precipitate was filtered and washed to give, in 71% yield, 2.1 g of 2-[2-(2-amino-6-methyl-4-pyrimidinyl)-ethenyl]-quinoxaline 1,4-dioxide (this same compound had been designated in the parent application as 2-[2-(amino-3-methyl-5-pyrimidinyl)-ethenyl]-quinoxaline 1,4-dioxide) designated CO-2 for convenience. It melted with decomposition at 240° C.

The product was tested against the five strains of *Vibrio cholerae* as described in Example 1. The results are given in table 1. There was no growth after 48 hours of 3 of the organisms at 10 μg/ml of CO-2, only marginal growth of the remaining two at 100 μg/ml.

Compound CO-2 is tested against *Treponema hyodysenteriae* as described in Example 1. The minimum inhibitory concentration is about 0.1 μg/ml and the minimum bacteriocidal concentration is less than 1.0 μg/ml.

Compound CO-2 is tested for toxicity in the same manner as described for CO-1 in Example 1. Comparable results are obtained showing that the compound is suitable for prophylactic or therapeutic treatment of swine dysentery.

EXAMPLE 4

Compound CO-2 is mixed with swine rations at a level of 200 g/ton and is fed to swine housed in an area where there has been a previous outbreak of swine dysentery. The members of the herd remain free from symptoms during the duration of their stay. Another herd is housed in a similar area where there has been a previous outbreak of dysentery. They are fed the same rations as the first herd but with no CO-2 or other drug. Many members of the herd develop symptoms of dysentery. CO-2 is then mixed with the rations at a level of 400 g/ton. The spread of the disease is halted and the diseased members become free from symptoms.

EXAMPLE 5

Swine rations typically contain a protein content ranging from about 12 to 18 percent protein on a weight basis. Table 11 sets forth examples of starter, grower and finisher swine rations.

Table 11

| | Starter (30–75 lb)[1] | Grower (75–130 lb)[1] | Finisher (130–220 lb)[1] |
|---|---|---|---|
| Ground Corn #2 | 1478 lb | 1620 lb | 1697 lb |
| SBOM, 44% | 454 | 324 | 257 |
| Dicalcium Phosphate | 20 | 18 | 14 |
| Ground Limestone | 23 | 17 | 15 |
| Iodized Salt | 10 | 8 | 7 |
| Vitamin Premix[2] | 10 | 8 | 5 |
| Trace Mineral Mix[3] | 5 | 5 | 5 |

[1]Weight of Pig.
[2]Vitamin Premix

| | | |
|---|---|---|
| Vitamin A (30,000 IU/gm) | 1000 | gm |
| Vitamin D$_3$ (200,000 IU/gm) | 20 | gm |
| BY-24 (Riboflavin) | 300 | gm |
| CaPantothenate, 45% | 150 | gm |
| Niacin, 98% | 200 | gm |
| Choline 25 | 4600 | gm |
| Proferm 20 (Vit. B$_{12}$) | 3600 | gm |
| Perma E (20,000 IU/lb.-Vit. E) | 2270 | gm |
| Biotin | 1 | gm |
| Ground Corn | 33129 | gm |

Table 11-continued

| | Starter (30–75 lb)[1] | Grower (75–130 lb)[1] | Finisher (130–220 lb)[1] |
|---|---|---|---|
| | TOTAL | 45360 gm (100 lb.) | |

[3]Trace Mineral Premix

| | | |
|---|---|---|
| CCC Trace Mineral | 4536 | gm |
| Zinc Oxide | 600 | gm |
| | 5136 | gm |
| Ground Corn | 17544 | gm |
| TOTAL | 22680 | gm (50 lb.) |

To one ton of the preceding grower ration is added 200 grams of compound CO-2 by the following procedure: 200 grams of CO-2 are mixed with a five pound aliquot of the ration, which in turn is successively mixed into or with larger aliquots until the CO-2 is essentially uniformly mixed with the whole ration which is a feeding composition. The feeding composition so prepared supplies 200 grams of compound CO-2 per ton of finished ration.

The same procedure is essentially followed to provide starter and finisher rations containing CO-2.

EXAMPLE 6

CO-1 compound is advantageously administered to swine by incorporating it in drinking water provided for swine in swine dysentery-inhibiting amounts, generally these amounts are of about 25 to 500 parts per million of water, for instance from about 25 to 200 parts per million for prophylaxis and 200 to 500 parts per million for therapy.

We claim:

1. A method of combatting swine dysentery comprising the prophylactic or therapeutic administration to the animal of an effective amount of a compound represented by the formula:

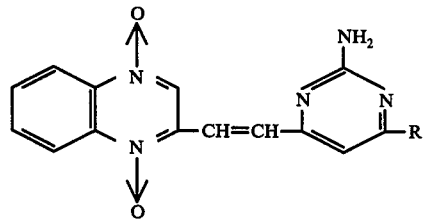

where R is hydrogen or lower alkyl.

2. The method of claim 1 wherein R is hydrogen.
3. The method of claim 1 wherein R is methyl.
4. The method of claim 1 wherein said compound is incorporated in the feed rations at a level of from 25 to 500 g/ton.
5. The method of claim 4 wherein the level of said compound is from 100 to 200 g/ton.
6. The method of claim 4 wherein the level is from 200–500 g/ton.
7. A swine feed composition comprising a nutritional swine feed and as an active ingredient, an effective amount of a substituted quinoxaline represented by the formula

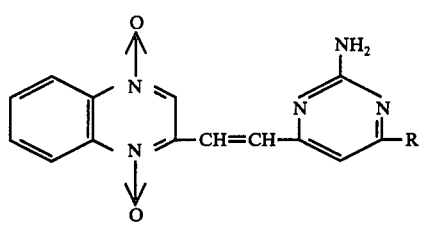

where R is hydrogen or lower alkyl.

8. The composition of claim 7 where R is hydrogen and the composition contains swine dysentery-inhibiting amounts of the quinoxaline.

9. The composition of claim 7 where R is methyl and the composition contains swine dysentery-inhibiting amounts of the quinoxaline.

10. The composition of claim 7 wherein the nutritional source is a swine ration containing from about 12 to 18 percent by weight protein and the quinoxaline is incorporated in the feed at a level of from 25 to 500 g/ton.

11. The composition of claim 10 wherein the level of said quinoxaline is from 100 to 200 g/ton.

12. The composition of claim 10 wherein the level of said quinoxaline is from 200 to 500 g/ton.

13. A method of combatting swine dysentery by administration to swine exposed, or likely to be exposed, to a swine dysentery-producing organism an effective amount of a substituted quinoxaline represented by the formula

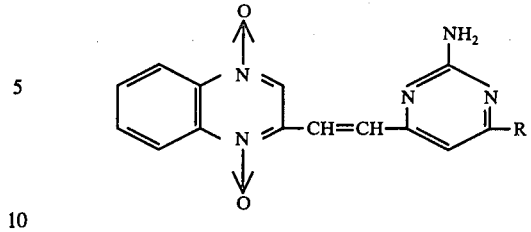

wherein R is hydrogen or lower alkyl.

14. The method of claim 11 wherein the swine dysentery-producing organism is a Vibrio or Treponema organism.

15. The method of claim 14 where R is hydrogen.

16. The method of claim 15 where R is methyl.

17. The method of claim 14 wherein the quinoxaline is prophylactically administered for a time sufficient to combat swine dysentery.

18. The method of claim 17 wherein the prophylactic administration includes the administration of a swine feed ration containing from about 12 to 18 percent by weight protein and having swine dysentery-inhibiting amounts of the quinoxaline.

19. The method of claim 18 wherein the amounts of quinoxaline incorporated in the feed is at a level of 25 to 500 g/ton of feed.

20. The method of claim 1 wherein said compound is incorporated in drinking water provided for and consumed by swine in swine dysentery-inhibiting amounts.

21. The method of claim 20 wherein these amounts range from about 25 to 500 parts per million of water.

22. The method of claim 21 wherein these amounts range from about 25 to 200 parts per million for prophylaxis.

23. The method of claim 21 wherein these amounts range from 200 to 500 parts per million for therapy.

* * * * *